US007690493B1

(12) United States Patent
Nunis

(10) Patent No.: US 7,690,493 B1
(45) Date of Patent: Apr. 6, 2010

(54) DEBRIS REMOVAL SYSTEM AND METHOD FOR STADIUMS AND ARENAS

(75) Inventor: Richard A. Nunis, Windermere, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 209 days.

(21) Appl. No.: 11/580,819

(22) Filed: Oct. 13, 2006

Related U.S. Application Data

(60) Provisional application No. 60/726,891, filed on Oct. 14, 2005.

(51) Int. Cl.

| | |
|---|---|
| ***E04H 3/10*** | (2006.01) |
| ***B65F 1/14*** | (2006.01) |
| ***G09F 23/00*** | (2006.01) |
| ***B65F 1/00*** | (2006.01) |
| ***B65G 11/00*** | (2006.01) |

(52) U.S. Cl. .................... 193/2 R; 40/306; 220/495.06; 220/908.1; 52/9; 52/8; 52/10; 52/66

(58) Field of Classification Search ................. 220/282, 220/478, 531, 540; 193/2 R
See application file for complete search history.

(56) References Cited

U.S. PATENT DOCUMENTS

| | | | | | |
|---|---|---|---|---|---|
| 893,267 | A | | 7/1908 | Schellenberg | |
| 1,360,569 | A | | 11/1920 | Orr | |
| 1,538,239 | A | | 5/1925 | Clauderpierre | |
| 1,583,833 | A | | 5/1926 | Howell | |
| 1,648,846 | A | * | 11/1927 | Harris | 15/339 |
| 1,719,545 | A | * | 7/1929 | Grapp | 193/33 |
| 1,968,007 | A | * | 7/1934 | Willey | 193/34 |
| 2,177,328 | A | | 10/1939 | Pender | 193/34 |
| 2,792,171 | A | | 5/1957 | Rosset | 232/43.3 |
| 3,744,653 | A | * | 7/1973 | Jensen | 414/471 |
| 3,803,738 | A | * | 4/1974 | Weiss | 40/306 |
| 3,813,128 | A | | 5/1974 | Ekstrom | 302/39 |
| 3,869,050 | A | | 3/1975 | Michel | 214/16 R |
| 3,951,461 | A | | 4/1976 | De Feudis | 302/27 |
| 4,013,215 | A | | 3/1977 | Mercier | 232/43.1 |
| 4,589,592 | A | | 5/1986 | Wassdahl | 232/43.1 |
| 4,640,403 | A | * | 2/1987 | McDermott | 193/34 |
| 5,015,021 | A | * | 5/1991 | Wyson et al. | 292/230 |
| 5,015,142 | A | * | 5/1991 | Carson | 414/408 |
| 5,031,829 | A | | 7/1991 | Shantzis | 232/43.2 |
| 5,127,507 | A | | 7/1992 | McDermott | 193/2 R |
| 5,155,976 | A | | 10/1992 | Okabe et al. | 53/537 |

(Continued)

*Primary Examiner*—Gene Crawford
*Assistant Examiner*—Kavel P Singh
(74) *Attorney, Agent, or Firm*—Brian S. Steinberger; Law Offices of Brian S. Steinberger, P.A.

(57) ABSTRACT

Systems and methods to facilitate the cleaning of arenas, such as stadiums having different seating levels. Pivotable bins can collect and funnel trash from different levels such as the concourse level. A series of tubes or chutes can be fixed to the arena structural undercarriage. Approximately 24" diameter tubes can be used to funnel trash from the bins located on perimeter arena walkways to receptacle containers, recycling containers at ground levels, and even refuse removal trucks. The chutes and tubes can be located adjacent to walkway aisles on different levels of the arena. The chutes/tubes can be vertically oriented and/or be inclined as long as refuse can move down the chutes by gravity. Grates can be also used beneath the bins. And locks can further provide safety.

14 Claims, 15 Drawing Sheets

U.S. PATENT DOCUMENTS

| | | | | | |
|---|---|---|---|---|---|
| 5,190,165 | A | | 3/1993 | Garfield, Jr. | 209/655 |
| 5,213,402 | A | | 5/1993 | Bernal et al. | 312/242 |
| 5,551,576 | A | | 9/1996 | Importico | 209/705 |
| 5,678,975 | A | | 10/1997 | Okabe et al. | 414/403 |
| 5,695,115 | A | | 12/1997 | Shantzis et al. | 232/43.2 |
| 5,749,186 | A | | 5/1998 | Kaufman et al. | 52/236.3 |
| 5,806,759 | A | | 9/1998 | Axisa | 232/44 |
| 5,921,032 | A | * | 7/1999 | Labinski | 52/9 |
| 6,276,553 | B1 | * | 8/2001 | Vulcano | 220/495.06 |
| 6,354,441 | B1 | | 3/2002 | Geiman | 209/702 |
| 6,698,142 | B2 | | 3/2004 | Denny | 52/8 |

* cited by examiner

DEBRIS REMOVAL SYSTEM AND METHOD FOR STADIUMS AND ARENAS

This invention claims the benefit of priority of U.S. Provisional Patent Application Ser. No. 60/726,891 filed Oct. 14, 2005.

FIELD OF INVENTION

This invention relates to debris removal, in particular to systems and methods of using pivotable trash containers and bins to funnel debris from various levels in stadiums and public arenas by gravity through chutes to lower level based receptacles and trash removal vehicles.

BACKGROUND AND PRIOR ART

Large public arenas such as outdoor and indoor stadiums that can seat tens of thousands of fans will often generate great amounts of debris and refuse during entertainment and sports type events. Typically, refuse must be collected in fixed trash receptacles in many locations throughout these stadiums. Generally each of the many receptacles usually will have trash bags that when full must then be individually emptied, and then followed by adding new trash bags that must be individually installed into each receptacle.

The filled trash bags must then be individually transported often from the various different levels and locations in these large arenas to dumpsters and/or garbage trucks, and the like, that are located on different floors such as being on the ground level.

Clearly, the cleaning time, the costs to replace bags, and the associated labor costs from cleanup crews to constantly empty and refill individual receptacles are time consuming and very expensive.

Various patented devices and systems have been proposed over the years. See for example, U.S. Pat. Nos. 893,267 to Schellenberg; 1,360,569 to Off; 1,538,239 to Claudespierre; 1,583,833 to Howell; 1,719,545 to Grapp; 2,177,328 to Pender; 2,792,171 to Rosset; 3,813,128 to Ekstrom; 3,869,050 to Michel; 3,951,461 to De Feudis; 4,013,215 to Mercier; 4,589,592 to Wassdahl; 5,031,829 to Shantzis; 5,127,507 to McDermott; 5,155,976 to Okabe et al.; 5,190,165 to Garfield, Jr.; 5,213,402 to Bermal et al.; 5,551,576 to Importico; 5,678,975 to Okabe et al.; 5,695,115 to Shantzis et al.; 5,749,186 to Kaufman et al.; 5,806,759 to Axisa; 6,354,441 to Geiman; and 6,698,142 to Denny. However, none of these techniques solves all the problems that are addressed above.

Thus, the need exists for solutions to the above problems with the prior art.

SUMMARY OF THE INVENTION

A primary objective of the present invention is to provide systems and methods for transporting refuse in arenas such as stadiums using pivotable bins that open to pass refuse by gravity through chutes to receptacles, recycle containers and trucks.

A secondary objective of the present invention is to provide systems and methods for transporting refuse that can be built into arenas such as stadiums where the cost pays for itself within a short time by saving on labor and materials over current systems.

A third objective of the present invention is to provide systems and methods for transporting refuse that can be easily retrofitted into existing arenas, and pay for itself within a short time.

A fourth objective of the present invention is to provide systems and methods for transporting refuse in arenas such as stadiums that reduces existing cleaning costs.

A fifth objective of the present invention is to provide systems and methods for transporting refuse in arenas such as stadiums that reduces existing labor costs.

A sixth objective of the present invention is to provide systems and methods for transporting refuse in arenas such as stadiums that are environmentally friendly.

A seventh objective of the present invention is to provide systems and methods for transporting refuse in arenas such as stadiums that is safe to maintenance workers and custodians and can be easily implemented over existing techniques.

In a preferred embodiment, the invention can include pivotable trashcan type bins that open up to chutes below the chutes that in turn feed into lower level based refuse collectors. The invention can be built (integrated) into new arenas that are being constructed or retrofitted into existing arenas. For example, the chutes can be fastened by straps and hangers below the undercarriage of an arena and/or be directly built into support walls and/or support structure beams of the arena. The cost of applying the invention to new or old arenas can be recouped within a few years at most from the savings in labor and cleaning costs based on existing trash/refuse removal.

The invention can be built to be integral with the arena structure. Trash can type containers can be placed at exit stair locations along aisles between lower and upper seating sections. This location will allow fans/patrons at the arena the ability to dispose of trash during and after events, such as games occurring at the arena.

The trash can type containers can be mounted with a hinge on a bottom edge to cover an opening to a chute. The chutes would be preferably vertically oriented so that refuse passes by gravity straight to a large container such as a dumpster which could be later emptied into a trash truck, and the like. Alternatively, the chutes can empty directly into trash trucks, and the like. Still furthermore, the chutes can be downwardly angled as the stadium/arena structure may require. Still furthermore, the chutes can be angled so that two or more chutes can feed into a single lower level based refuse collector.

The hinged bottom of the trash receptacle can allow for selected maintenance workers or cleanup crews at the arena to tilt open the container when the event (ie game) is over so that any remaining trash can be swept or blown into the chute.

The trash can type container can have a typical opening in the top or along the sides to allow the patron to deposit their trash. In one version, the bottom of the trash can container can be closed, and the trash can container can have a bag liner that when full the bag is then closed by maintenance workers who then would tilt back the trash can container on its' hinge so the closed full trash bag can be deposited down the chute(s).

Alternatively, these containers can have an open bottom so that the deposited trash immediately passes into the chutes.

The opposite lower edge of the trash can container can have a tamperproof lock, such as a key or combination padlock that keeps the trash can containers from being tilted during the arena events. The lock would make sure safety concerns of having an open chute do not exist when using the invention.

Still further more, the trash can container can be marked for recycling, such as being labeled for paper and/or plastic, and/or glass, so that individual trash can containers are limited to passing certain trash down that particular chute.

Still furthermore, the trash can containers can be divided into dual compartments which in turn feed into dual chutes so that particular trash such as paper is to pass down one chute while another trash such as plastic is to pass down another chute, etc.

The chutes can be made from durable tubing, such as metal tubing such as aluminum, and the like, and can have diameters that range from approximately 6 inches to approximately 24 inches or more in diameter as needed.

Grates with narrow openings can be positioned between the trashcan bins and the upper openings to the chutes as an extra safety feature, which are strong enough in closed positions to support the weight of workers that can stand on the grates.

The chutes can be oriented in vertical orientations and/or inclined orientations so that refuse will easily move by gravity down the chutes. The invention will allow for two or more chutes to converge together into a main chute that passes the refuse into a single dumpster type receptacle.

In operation, after the pivotable bins are emptied and they are pivoted open, maintenance workers can blow loose trash directly into the floor located openings to the chutes by power blowers. Alternatively, the workers can use brooms to sweep the loose trash directly into the chutes.

Tools such as elongated rods with plunger type ends can be provided to the maintenance workers and cleanup crew to aid in pushing the refuse down the chutes.

The chutes can be cleaned with fluids such as soap and water, and/or detergent when needed that can be flushed down the chute(s). For example, a pressure washer, and/or a garden hose can be used to pass detergent cleansers down the chute to clean up any sticky messes, and the like.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

The components will now be identified.

| | |
|---|---|
| 1. | Stadium/arena |
| 5 | section of arena |
| 10 | concourse |
| 20 | upper level |
| 30 | lower level |
| 50 | entranceway(s) |
| 100 | pivotable bin |
| 110 | window to bin |
| 111 | upper open sides |
| 150 | hinge |
| 160 | tab/ring on bottom of bin |
| 165 | tab/ring on concourse |
| 170 | lock |
| 200 | chutes |
| 205 | upper opening to chute |
| 210 | inclined chute |
| 220 | inclined chute |
| 230 | funnel |
| 240 | chute tube section |
| 250 | upper threaded end |
| 260 | lower threaded end |
| 300 | refuse receptical(s) |
| 400 | patron |
| 500 | trash |
| 600 | trash bag |
| 700 | grate |
| 750 | grate hinge |
| 760 | upper/lower tabs/rings |
| 770 | grate lock |
| 800 | broom |
| 900 | power blower(gas or electric powered) |

Figure 1A:
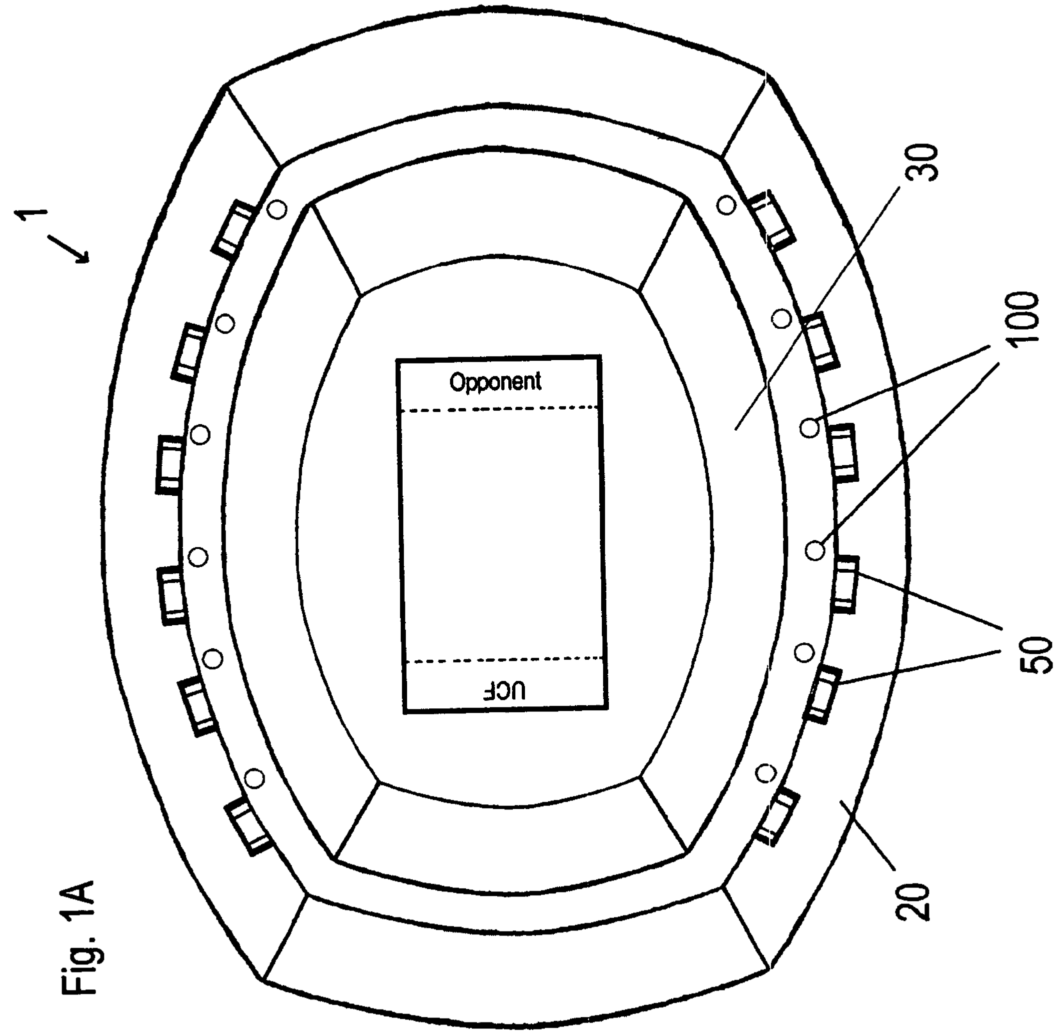
FIG. 1A is a top view of a stadium arena showing the pivotable bins of the novel invention located along different entrances to a concourse.
Figure 1B:
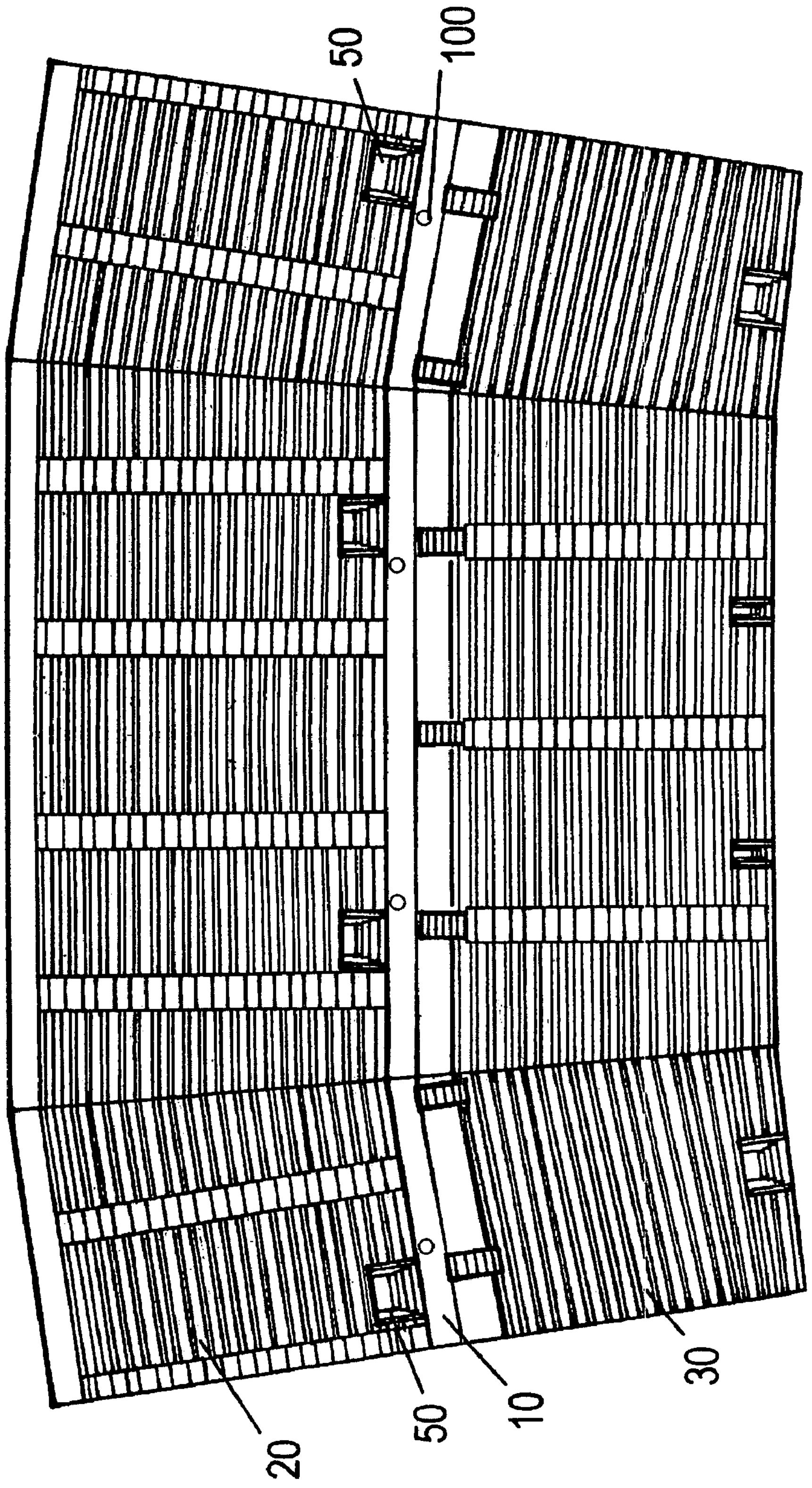
FIG. 1B is an enlarged perspective view of an arena section of the stadium of FIG. 1A with the concourse separating different seating levels.
Figure 2:
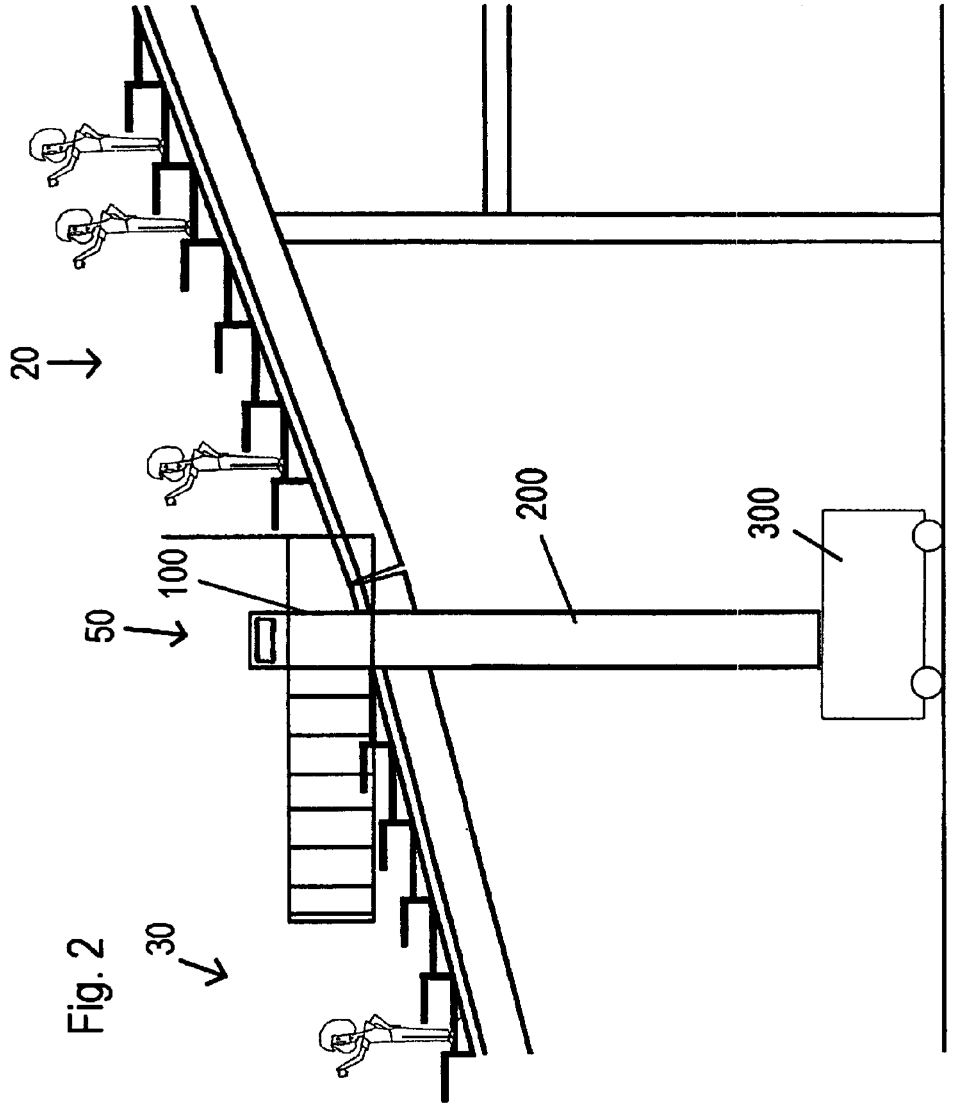
FIG. 2 is a side view of two stadium seating levels using the novel chutes in vertical orientations to a dumpster receptacle at ground level.

FIG. 1A is a top view of a stadium arena 1 showing the pivotable bins 100 of the novel invention located along different entranceways 50 onto a concourse 50. FIG. 1B is an enlarged perspective view of an arena section 5 of the stadium 1 of FIG. 1A with the concourse 50 separating different seating levels 20 and 30. FIG. 2 is a side view of two stadium seating levels 20, 30 about a concourse 10 with a single pivotable bin 100 above a chute 200 above a dumpster receptacle 300 at ground level.

In a preferred embodiment, an arena 1 that has numerous entrance-ways 50 to a concourse 50 that separates a low seating level 30 from an upper seating level 20, can have an equal number of pivotable bins 100, and chutes 200 that are adjacent to each entranceway 50. Likewise, there would be an equal number of refuse receptacles 300, each directly beneath each of the chutes 200. For example, an arena 1 having eighteen entrances onto the concourse 50 can have eighteen pivotable bins 100, each with its' own chute 200. And each chute 200 can empty out into separate dumpster type receptacles 300. The dumpsters 300 can be of various sizes such approximately four foot by six foot, and the like.

Installation can be easily accomplished during construction of the stadium/arena 1. The invention can also be retrofitted into existing stadium/arenas 1 by cutting openings in the floor of the concourse to attach the chutes to the openings.

Figure 3:
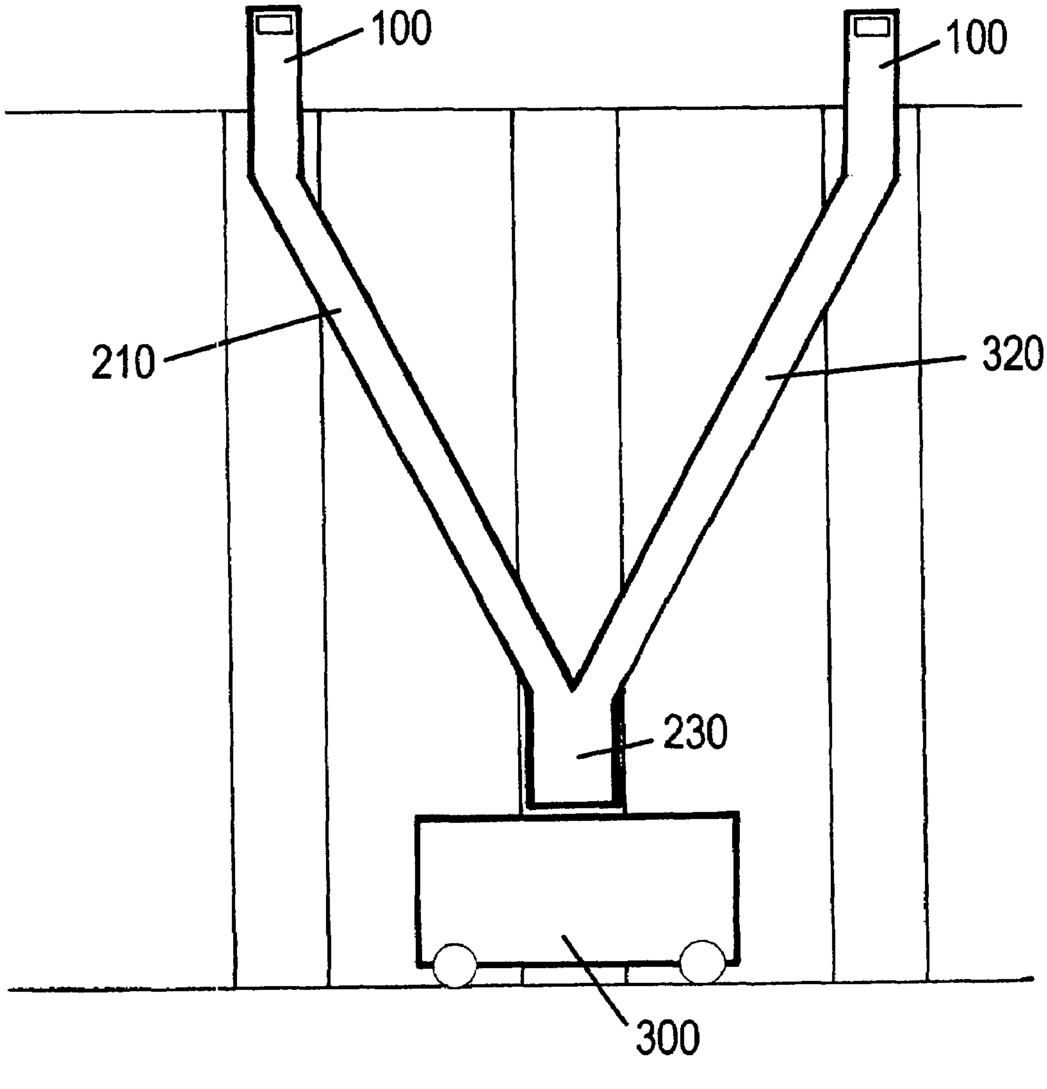
FIG. 3 is a side view of two chutes at inclines which pass refuse into a single receptacle at ground level.

The invention can function with a less number of chutes than there are pivotable bin receptacles. FIG. 3 is a side view of two chutes 210, 220 at inclines which pass refuse into a single funnel larger diameter section 230 that empties refuse into a refuse receiving receptacle 300, such as a dumpster, and the like, at ground level.

Figure 4:
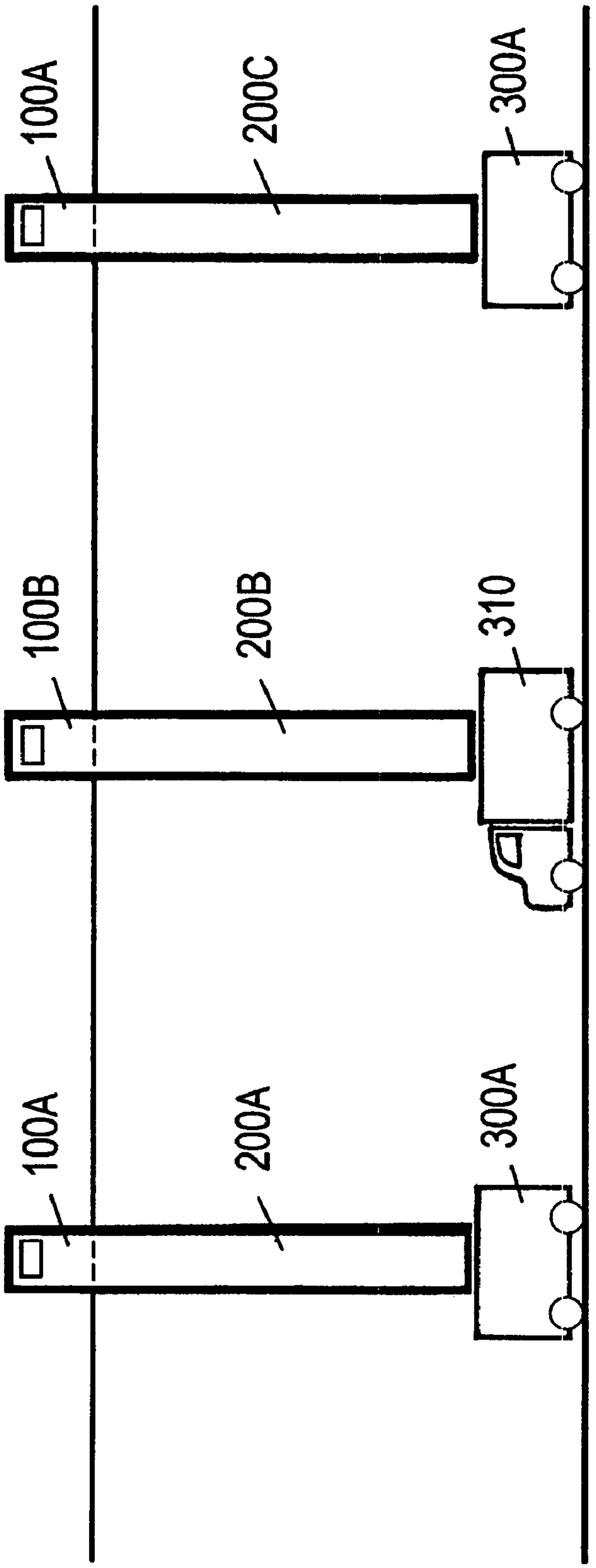
FIG. 4 shows using vertical chutes with some for use with recyclables and others for use with regular trash, and/or different types of refuse receivers such as dumpsters and trucks.

The invention can also allow for each pivotable bin 100 to have its' own chute 200A, 200B and 200C. In this version in FIG. 4, the vertical orientation allows for direct gravity feed into the refuse receptacles 300 under each chute 200A, 200B, 200C. Additionally, the invention can allow for the pivotable bins 100 to be labeled for different types of refuse. For example, pivotable bins 100A can be labeled for regular trash except for glass, plastic, and metal (cans, and the like), and pivotable bins 100B can be labeled for recyclables (such as glass, plastic and/or metal). Additionally, the refuse collectors can include different types of receptacles such as for example, dumpsters 300A for receiving regular trash, and receptacles 310, such as trash trucks for directly receiving recyclables. Still furthermore, the receptacles can be all dumpsters, or all trash trucks and the like, as well as different combinations, thereof.

Figure 5A:
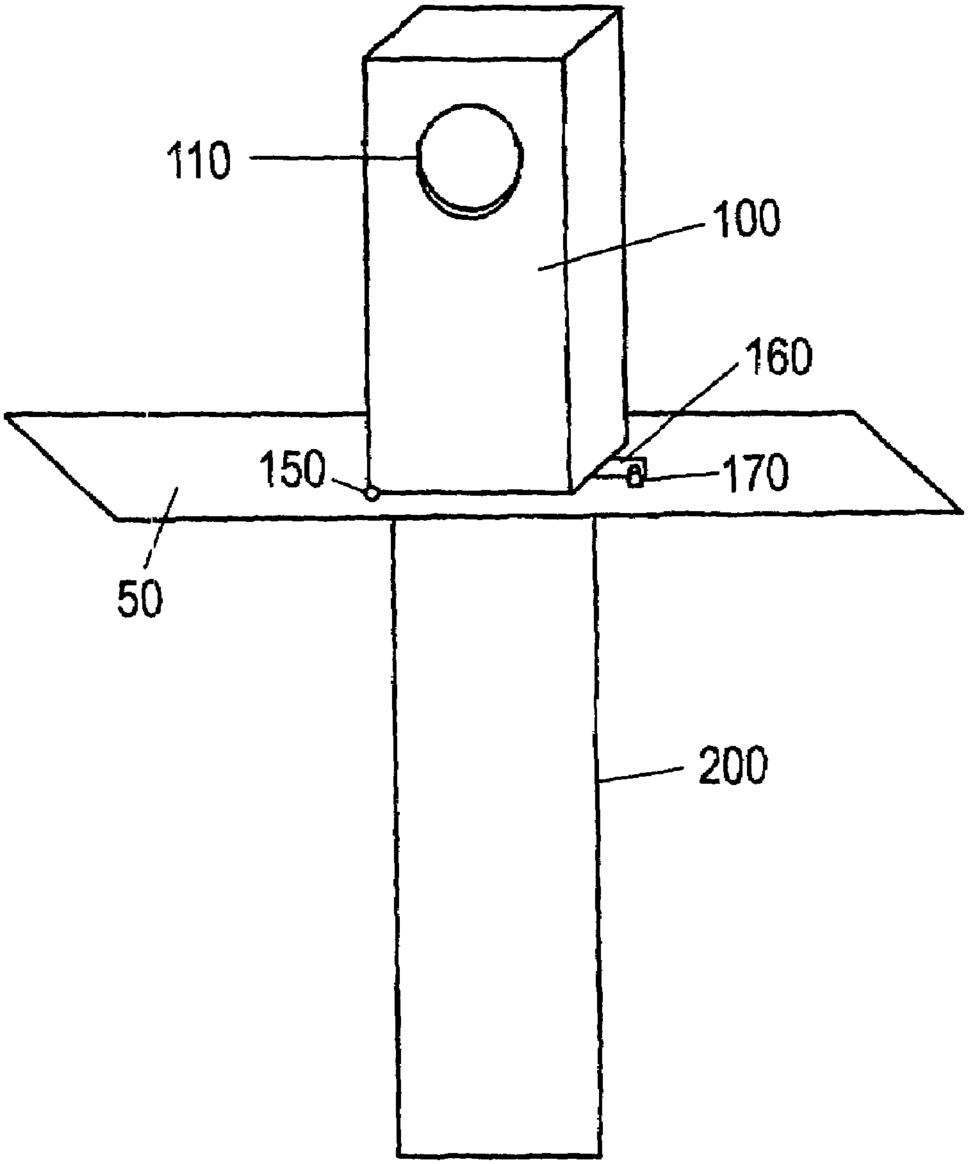
FIG. 5A is an enlarged view of the pivotal refuse collector container at the top of a chute.
Figure 5B:
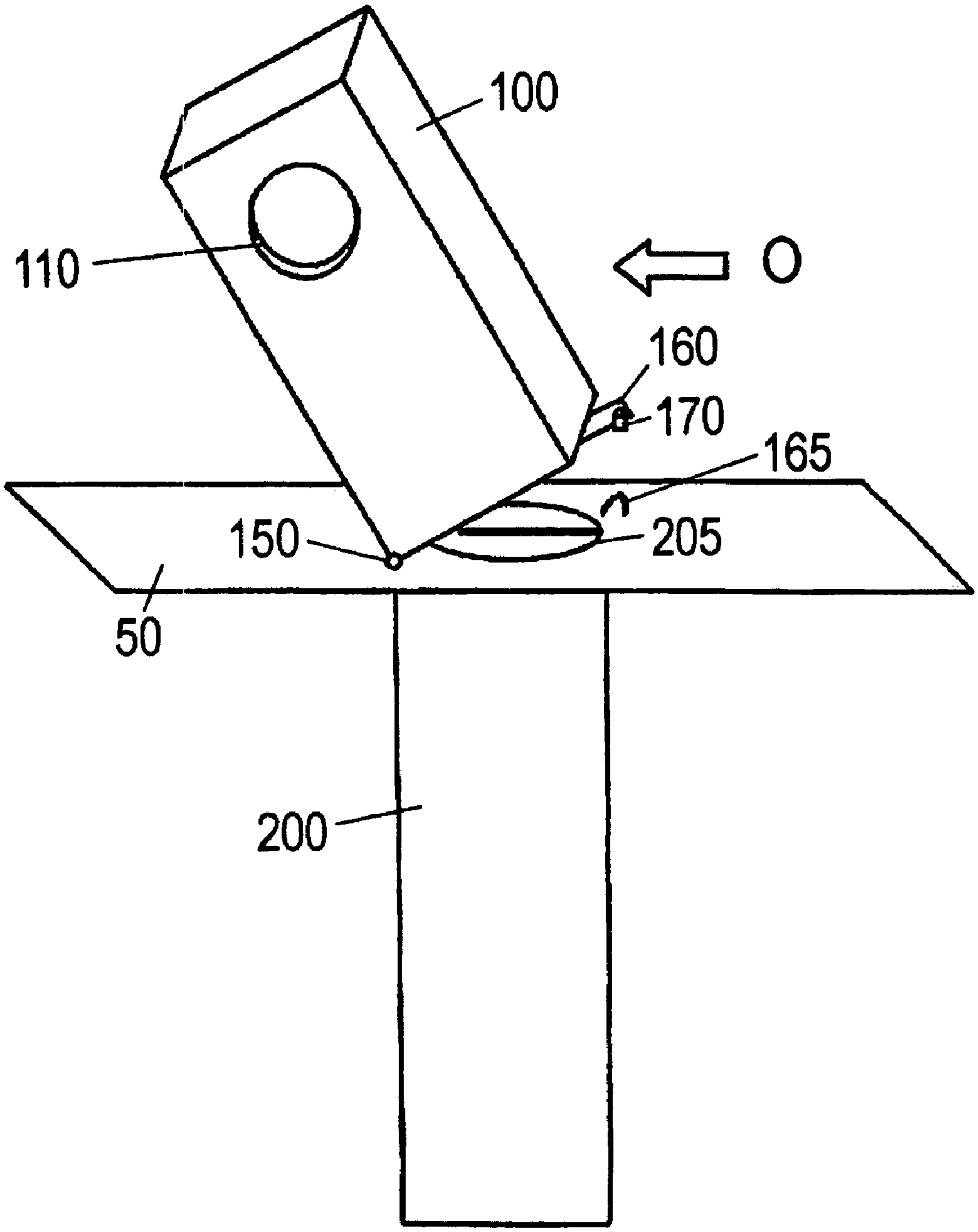
FIG. 5B shows the collector container of FIG. 5A tilted to allow access to the chute.
Figure 6A:
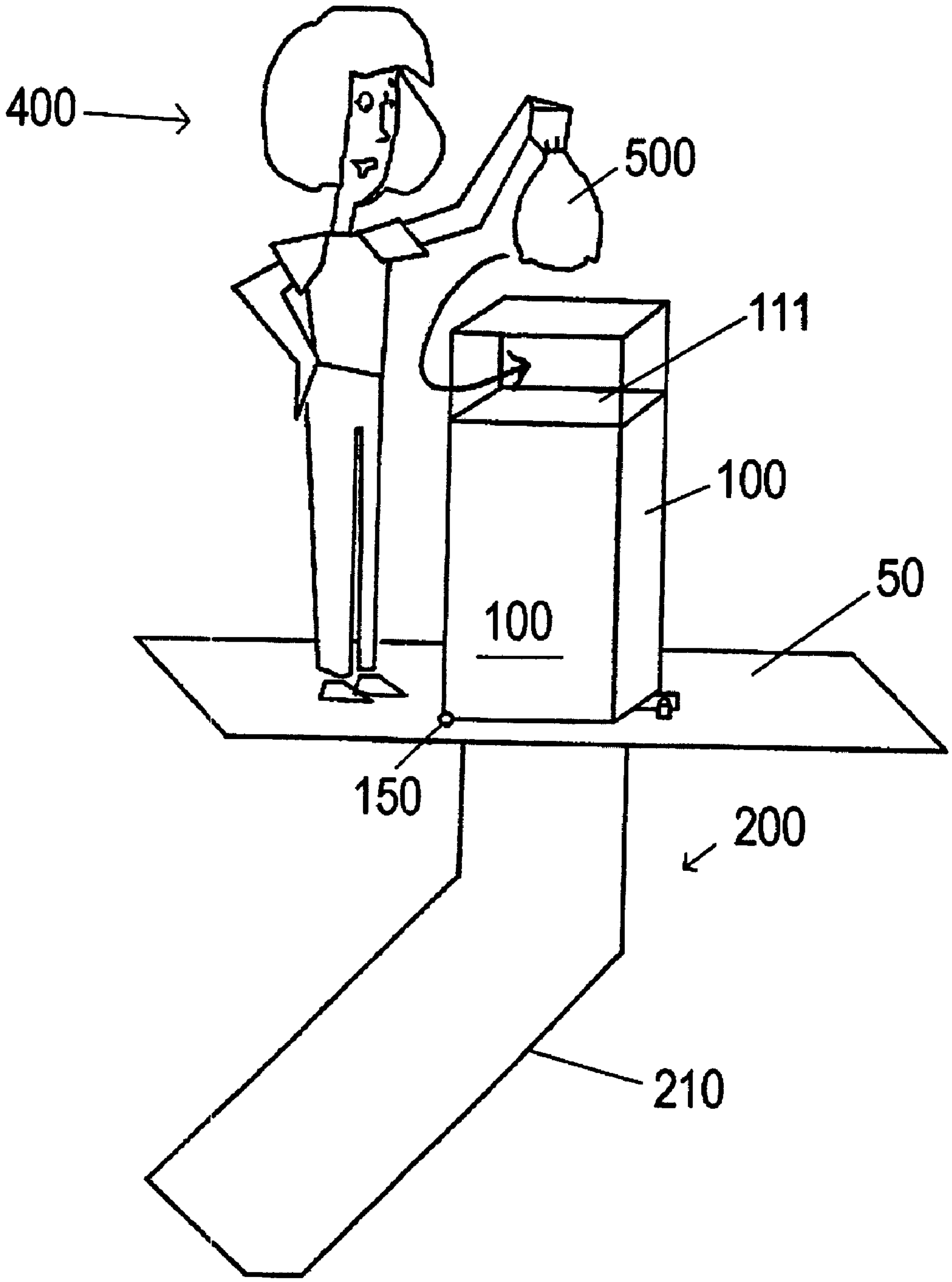
FIG. 6A shows a patron disposing of refuse into the refuse collector (trashcan) on top of the chutes.
Figure 6B:
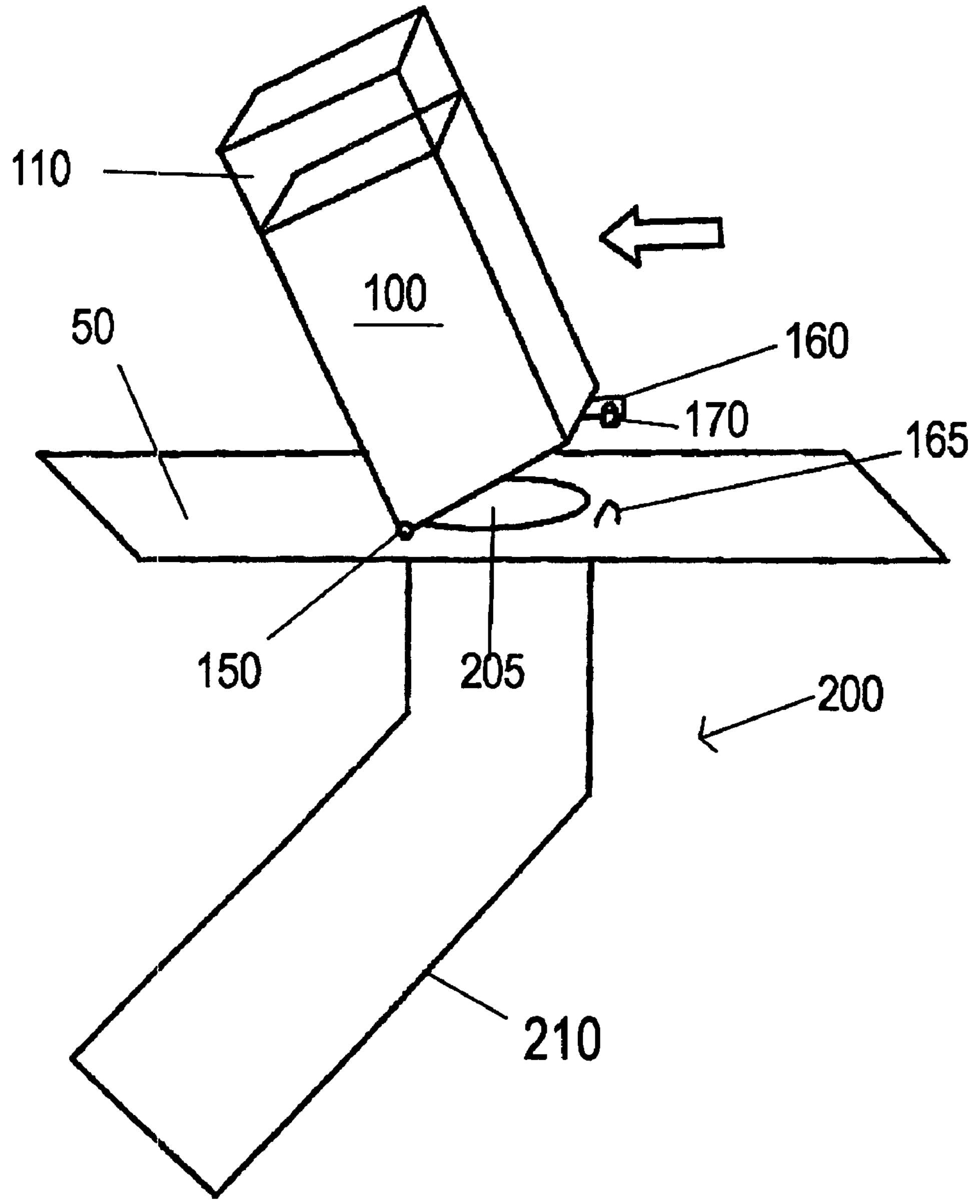
FIG. 6B shows the collector container of FIG. 6A tilted to allow access to the chute.

FIG. 5A is an enlarged view of the pivotal bin 100 used as a refuse collector container at the top of a chute 200. FIG. 5B shows the collector container of FIG. 5A tilted and rotated back along a hinge 150 to allow access to the upper opening 205 of the chute 200. FIG. 6A shows a patron 400 disposing of refuse/trash 500 into the refuse collector (trashcan) 100 on top of the chute 210. FIG. 6B shows the collector container of FIG. 6A tilted to allow access to the upper opening 205 to the chute 210.

Each refuse collector bin 100 can be fixably mounted to the ground along the concourse level 50 by a hinge type member 150 along one side bottom edge of the container bin 100. The opposite bottom end of each bin 100 can have a tab/ring 160 that attaches to a tab/ring on the concourse 50 adjacent to the opening 205 preferably by a tamper proof lock 170, such as an unbreakable durable key lock, where the keys are not easy to duplicate. The locks 160 can be keyed to a single key so that only one custodian has access to the locks with a single key.

Each bin 100 can have either or both a side window slot opening 110 or have the entire upper sides being open 111 to allow for trash to be easily deposited therein.

In a preferred application each of the bins 100 can have a closed bottom so that a removable trash bag can be inserted inside of the bin 100. After a stadium event the trash bag can be pulled out of the bin, and then the bin 100 is unlocked allowing the bin 100 to tilt backward allowing access to the opening 205 to the chute 200. The custodian can then deposit the entire trash bag down the chute 200.

Figure 7:
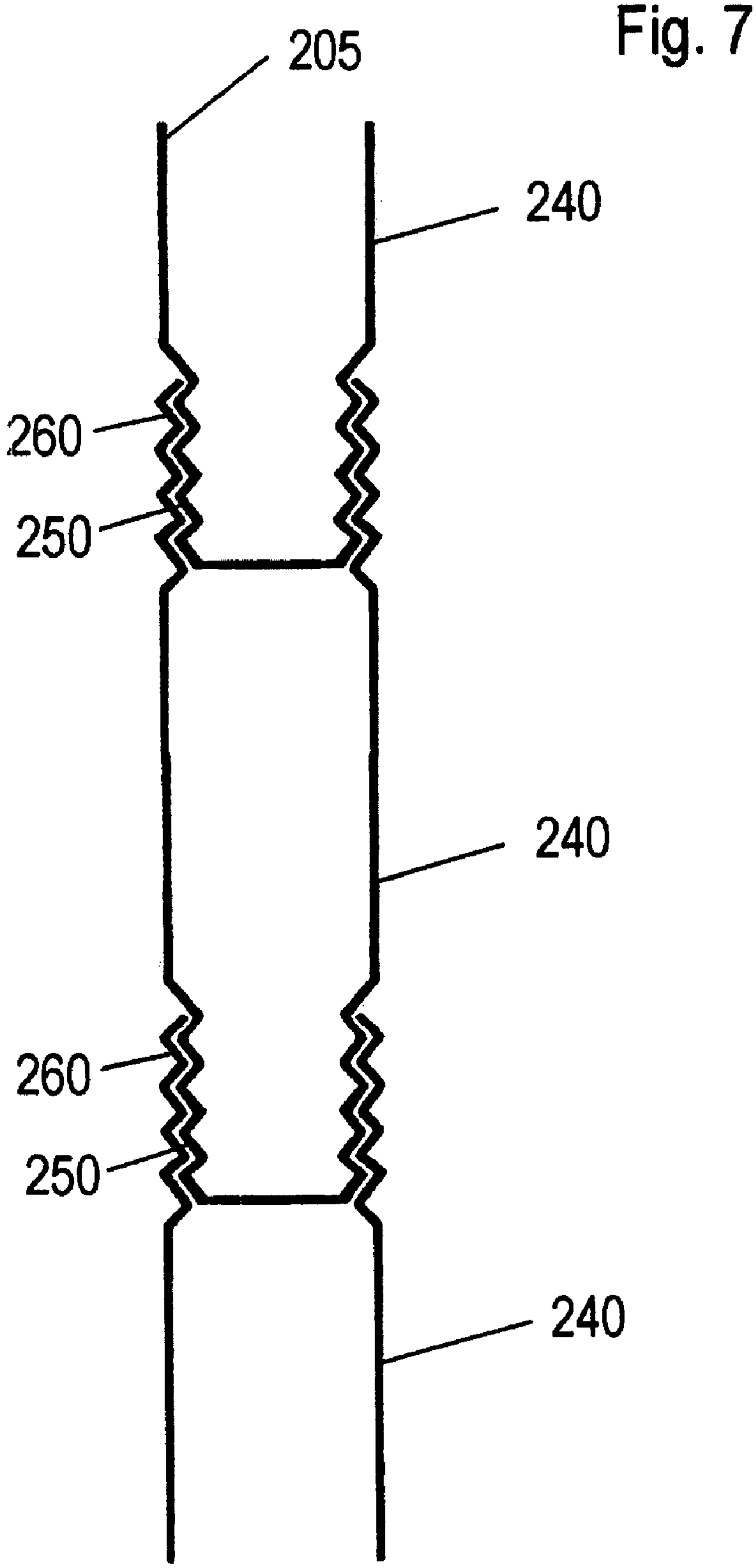
FIG. 7 is a cross-sectional view of a threaded together chute section.

FIG. 7 is a cross-sectional view of a single chute 200 that can be assembled by several threaded together chute section 240. The chute(s) 200 can be cylindrical and large enough to handle most debris, such as up to approximately 2 feet in diameter, and greater if needed. The chute 200 can be assembled from cylindrical piping/tubing type sections 240 where each end can mateably couple to adjacent pipe ends by threads, and the like. An upper threaded end 250 can have exterior threads that screws together with a lower internal threaded end 260 of an adjacent tube section 240. Each piping section 240 can be elongated enough so that the sections can be easily coupled together. For example, pipe sections can be for example, approximately six feet in length.

The chutes 200 and their sections 240 can be constructed preferably from metal piping such as but not limited to galvanized steel, stainless steel, and the like, for durability. The use of metal is advantageous over plastic, and the like, since metal would not be combustible and would not cause any fires from beneath the chute to travel through the chute itself. The chutes can also be coated with fire resistant coatings to further restrict and hamper flames and fire from different levels.

Additional safety measures can include positioning fire extinguisher and/or fire hose equipment adjacent to the chutes so that such equipment can be used to spray down the chutes in case a fire develops at a lower level.

The chutes 200 can also be coated inside and even outside with a non-stick surface, such as but not limited to Teflon® coating, and the like, so as to reduce and eliminate any debris from sticking to and clogging up the inside of the chute.

Still furthermore, the chutes 200 can be periodically cleaned. For example, after each major event at the stadium or after several events (several sports games), the chutes 200 can be individually cleaned by sending pressurized water from a pressure washer or city water supply, with or without a detergent (soap, and the like) down the individual chutes 200.

Figure 8:
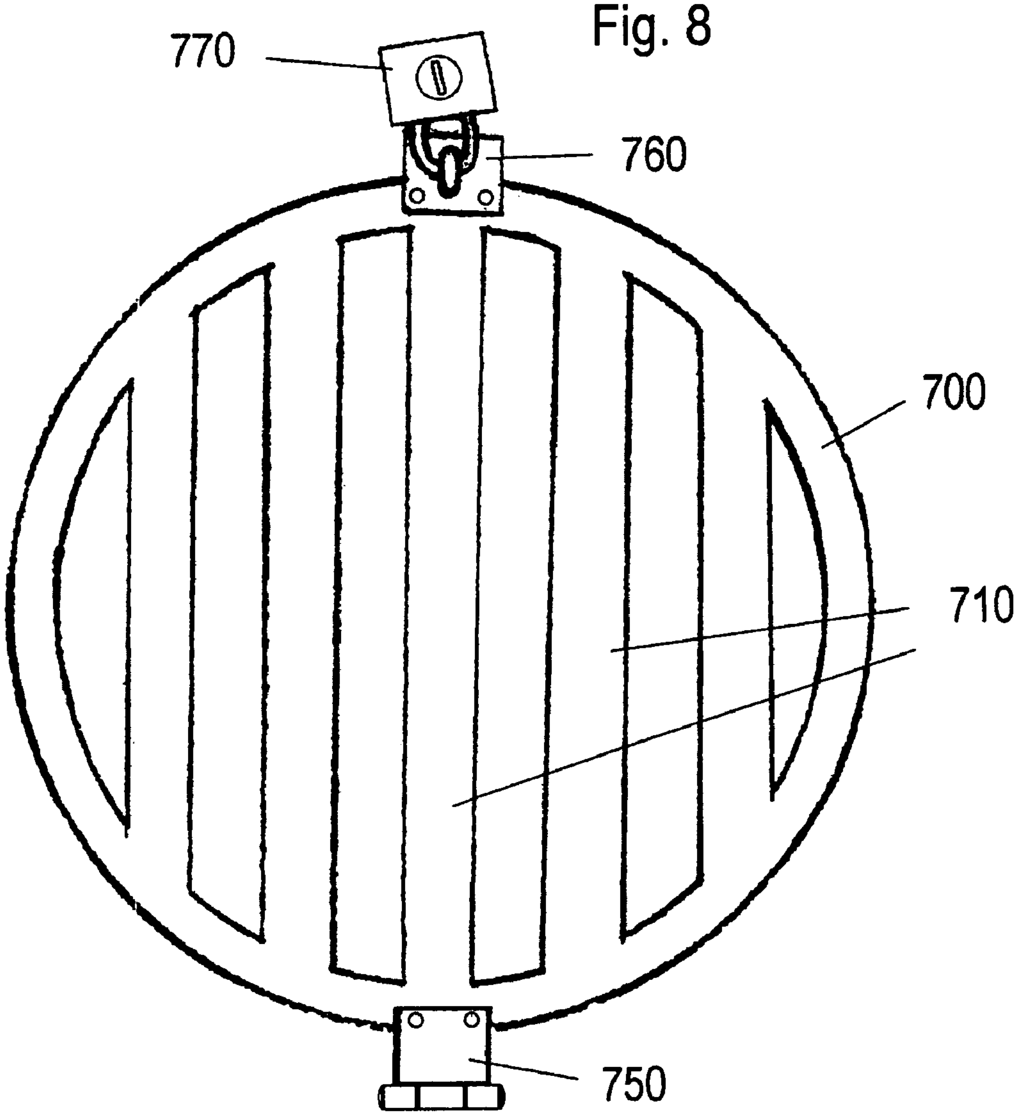
FIG. 8 is a top view of a grate below the pivotable bin and positioned over the chute opening.
Figure 9:
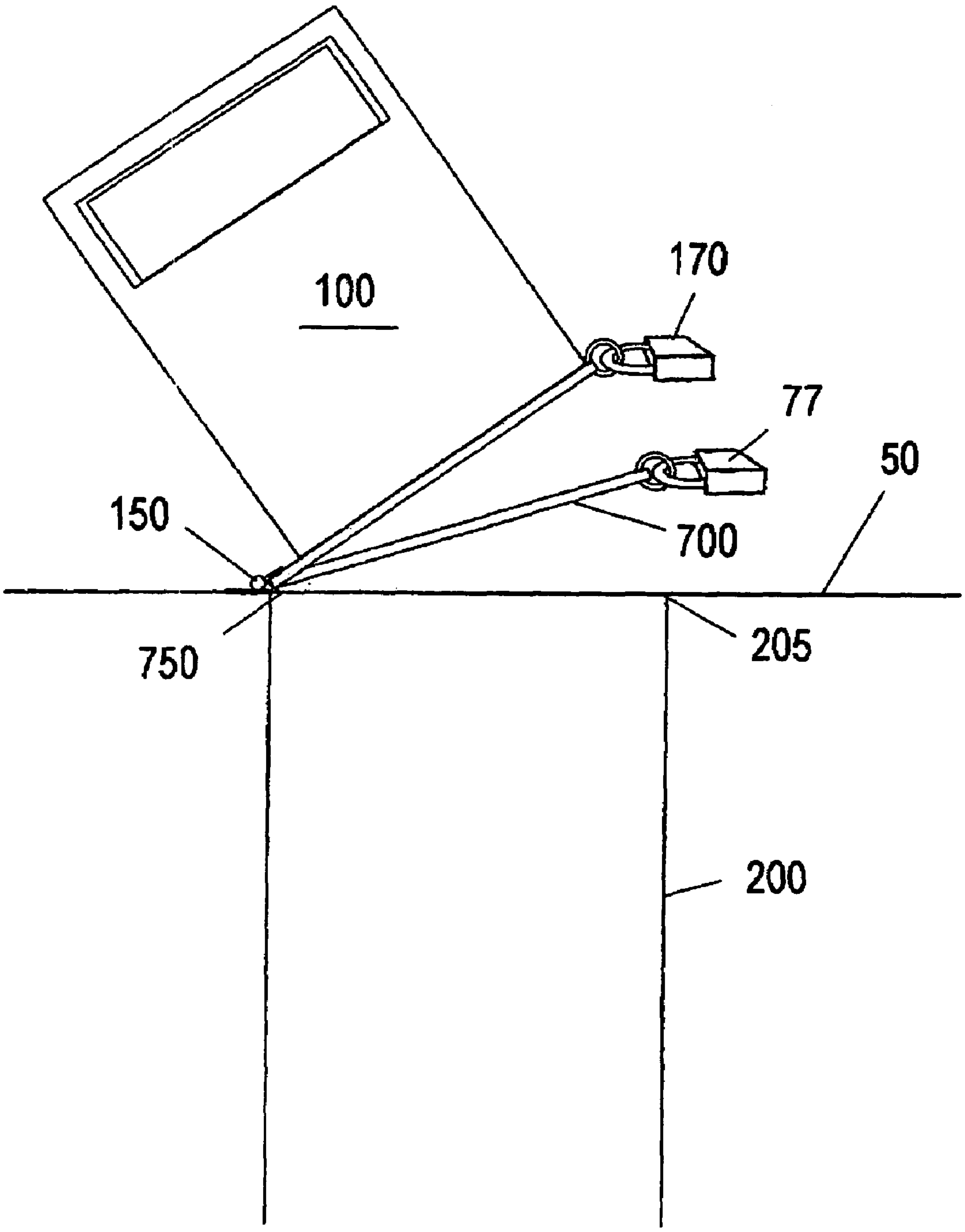
FIG. 9 shows the pivotable bin with the grate embodiment.

FIG. 8 is a top view of another version of the invention that can use a grate 700 below the pivotable bin 100 which is positioned over the chute opening 205. FIG. 9 shows the pivotable bin 100 with the grate 700.

A grate 700, preferably formed from metal such as galvanized steel, stainless steel, and the like can include metal bars 710 that are strong enough to support the weight of plural workers thereon so that the grate 700 can be used an additional safety feature to prevent anyone from accidentally falling down the chute 200. The bars 710 on the grate can be spaced approximately three inches to approximately six inches apart from one another, and preferably approximately four inches to approximately five inches apart from one another. A separate lock mechanism 770 can lock upper and lower tabs/rings on the grate 700 and concourse 50, similar to the similar components on the bin 100. The lock 770 can keep the grate 700 in a down locked position during events at the stadium. Similar to the lock 170 for the bin 100, only authorized individuals can have access to keys, and the like to open this separate lock.

The grates 700 can be used underneath a trash bin 100 that has a floor so that a maintenance worker has to still remove the trash bag 600 physically from the bin 100, and then separately open the grate 700 to drop the bag 600 into the chute 200.

After the bag is dropped down the chute, the maintenance worker can close the grate only and then sweep and brush loose trash into the chute, where it easily falls between the bars of the grate.

Additionally, the invention can allow for the grate to stay in a locked down position, and the trash bin be used without a collection bag, and without a floor inside of the container. Thus, during a stadium event, refuse deposited into the trash bin falls directly through the grate 700 and into the chute 200. After the event, the bin can be unlocked and pivoted back so that loose trash and debris is then swept and blown onto the grate and down the chute.

Figure 10A:
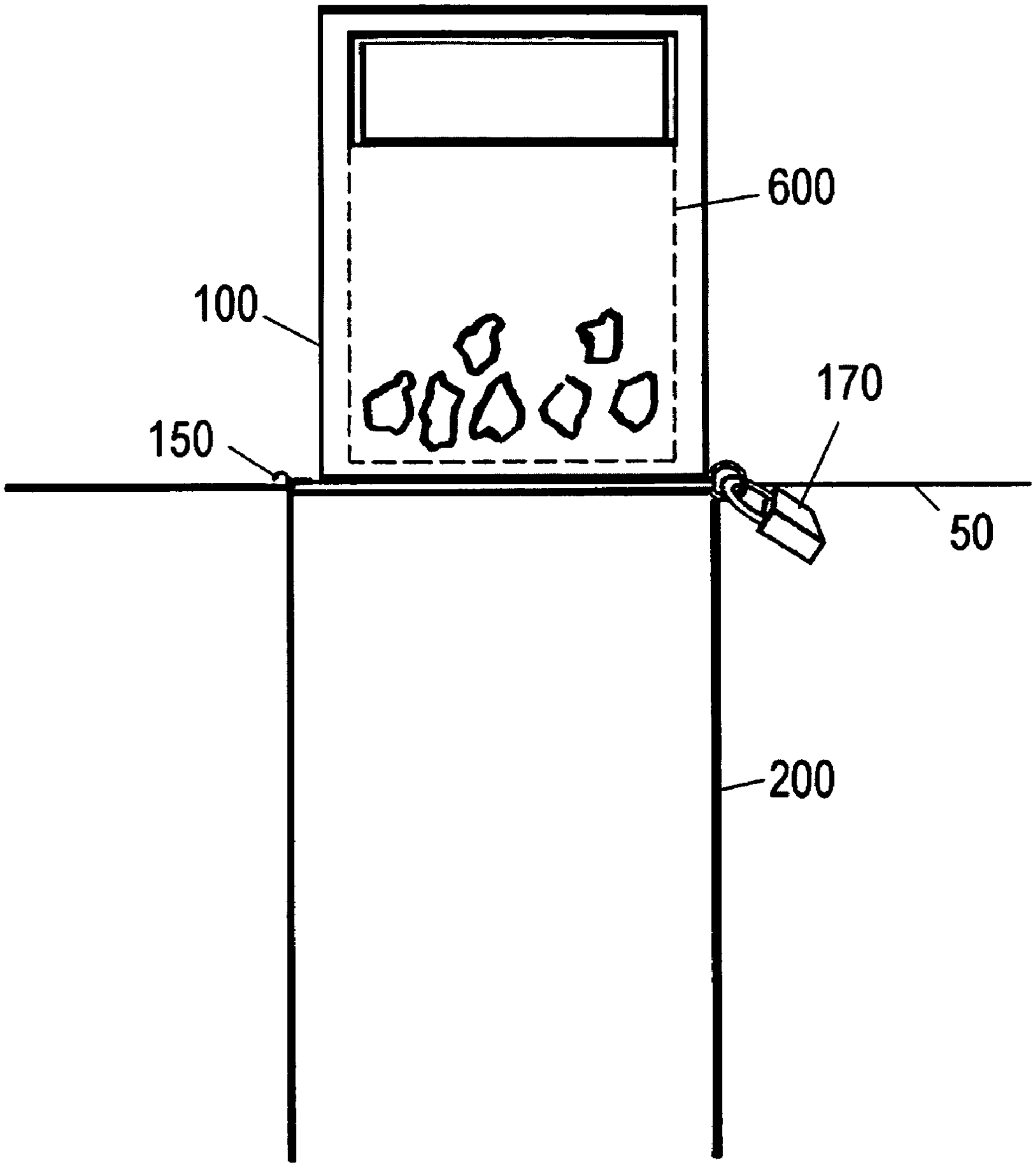
FIGS. 10A, 10B and 10C shows views and orientations of the novel pivotable bin in operation.
Figure 10B:
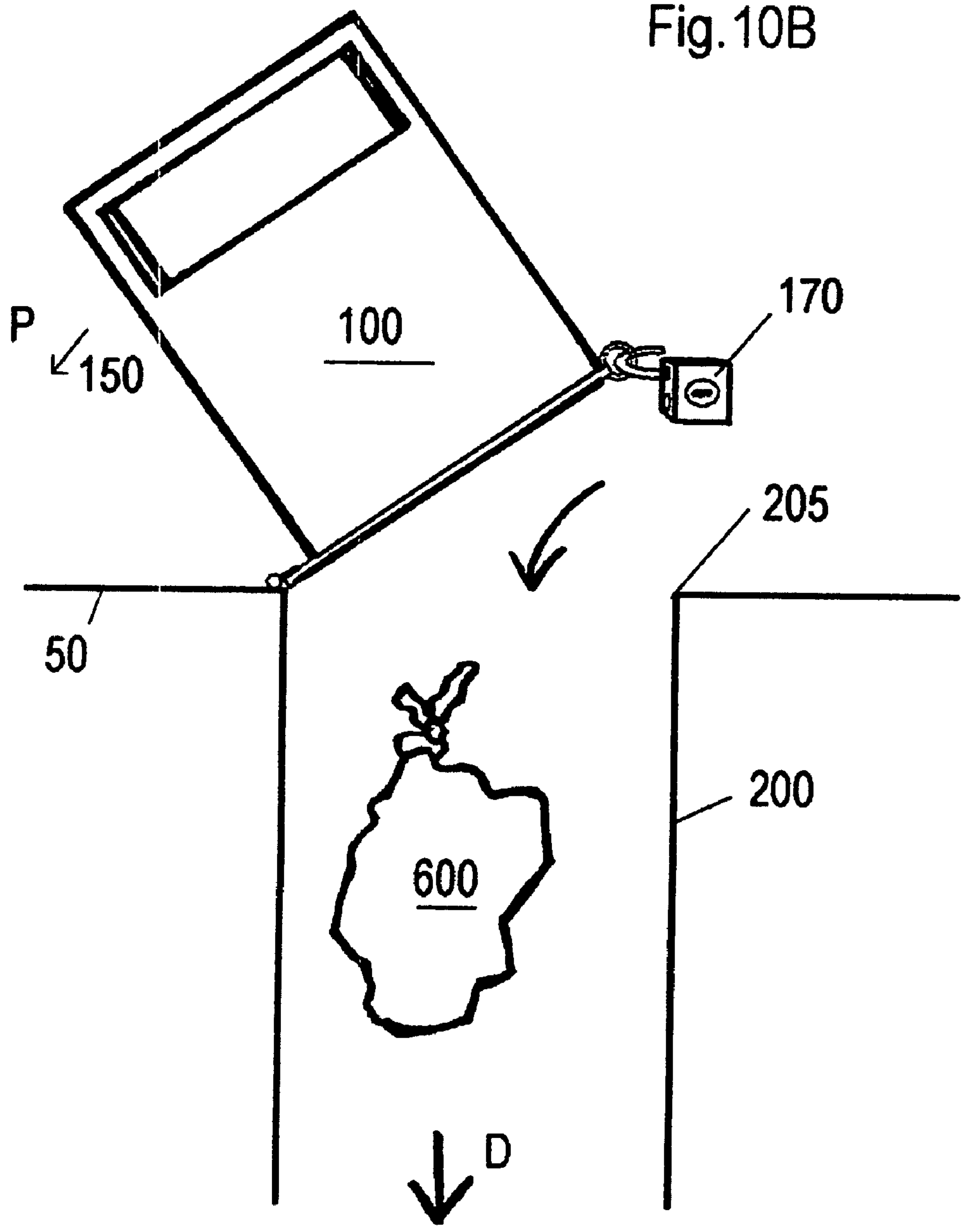
Figure 10C:
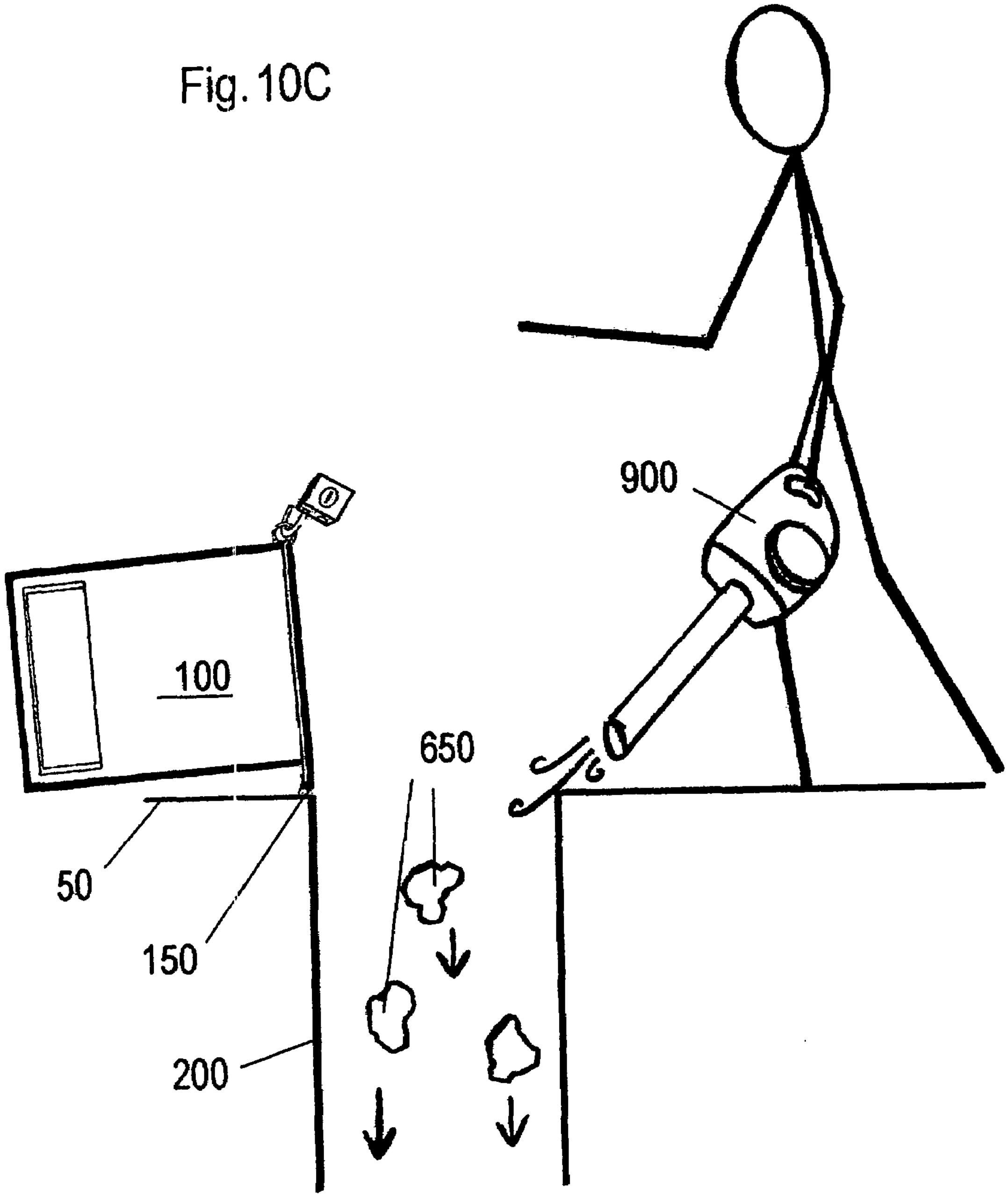

FIGS. 10A, 10B and 10C shows views and orientations of the novel pivotable bin 100 in operation. In a preferred application the invention allow for the individual bins 100 to have floors and be in locked down positions so that trash bags 600 can be positioned inside of the bins 100. At the end of the stadium event, a single maintenance supervisor would have the only access to unlock the individual bins so that they can pivot open in the direction of arrow P. Next maintenance workers can remove the filled refuse bags 600 and deposit such bags 600 down the opening 205 to the chutes 200, which drops the bags 500 into the refuse receptacles 300 that were previously described.

Next, the maintenance workers can move loose refuse and trash 650 by sweeping with a broom 800 and/or blowing loose trash with a power blower such as but limited to an electric or gas blowers 900 into the chute openings 205. After an event or game it is normal to have loose trash such as cups, napkins, and the like, scattered around different locations in the arena. The maintenance workers can easily drive upper deck located trash located under and around seats and the like, with power blowers such as electric or gas powered blowers. Loose trash on the concourse can also be easily moved by sweeping such trash with brooms, and the like.

Lower seating levels can also have additional pivotal bins that allow trash to be further directed to lower level trash receivers. For lower levels that are directly adjacent to the playing field, maintenance workers can just use power blowers and brooms to blow and sweep loose trash to single piles, where they can be easily collected.

Thus, the invention would eliminate having to separately bag loose refuse and trash after each arena event on each level in the stadium/arena, and would eliminate having to separately transport such bagged refuse to a removal location that is usually on a different floor such as ground level. The invention would have greater savings of time and labor in stadiums/arenas having plural concourses between various seating levels.

Although the preferred embodiment describes locating the pivotable bins on concourse levels, the invention can located the pivotable bins in other locations, such as but not limited to aisles, restrooms, skyboxes, and the like.

Referring to all the figures, the novel chutes can be used with indoor and outdoor sports arenas such as stadiums having multiple seating levels. The arenas can be any public and private ones that are used for various events from sports (games) to concerts, and the like.

The invention can be built (integrated) into new arenas that are being constructed or retrofitted into existing arenas. For example, the chutes can be fastened by straps and hangers below the undercarriage of an arena and/or be directly built into support walls and/or support structure beams of the arena. The cost of applying the invention to new or old arenas can be recouped within a few years at most from the savings in labor and cleaning costs based on existing trash/refuse removal.

The invention can be built to be integral with the arena structure. Trash can type containers can be placed at exit stair locations along aisles between lower and upper seating sections. This location will allow fans/patrons at the arena the ability to dispose of trash during and after events, such as games occurring at the arena.

As previously described, the chutes would be either or both vertically oriented and/or downwardly angled so that refuse passes by gravity straight to a large container such as a dumpster which could be later emptied into a trash truck, and the like. Alternatively, the chutes can empty directly into trash trucks, and the like.

Although the preferred embodiment has trash bins with closed bottoms, bins can also have an open bottom so that the deposited trash immediately passes into the chutes.

The trash can containers can have different sizes and shapes that can be marked for recycling, such as being labeled for paper and/or plastic, and/or glass, so that individual trash can containers are limited to passing certain trash down that particular chute.

Still furthermore, the trash can containers can be divided into dual compartments which in turn feed into dual chutes so that particular trash such as paper is to pass down one chute while another trash such as plastic is to pass down another chute, etc.

Tools such as elongated rods with plunger type ends can be provided to the maintenance workers and cleanup crew to aid in pushing the refuse down the chutes.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

The invention claimed is:

1. A refuse system for arenas, comprising:

an upper seating level having a plurality of seats adapted for seating patrons in seated positions above an upper floor surface;

a lower seating level having a plurality of seats adapted for seating patrons in seated positions above a lower floor surface, the upper seating level being above the lower seating level;

a concourse level between the upper seating level and the lower seating level, the concourse level having a concourse floor surface, and having a plurality of entranceways for allowing patrons to enter and exit onto the upper and the lower seating levels;

a plurality of elongated generally upright chutes spaced apart from one another along the concourse level, each of the chutes having a single upper input end in openings in the concourse floor surface, where each upper input end of the chutes is flush to the concourse floor surface and each upper input end does not extend above the concourse floor surface, each of the chutes being located adjacent the entranceways, and each of the chutes having a lower exit end below the concourse level, the chutes allowing for refuse to pass by gravity down each respective chute; and a plurality of trash can bins located above each of the upper input ends of the chutes, the trash can bins being positioned to sit on top of the concourse floor surface of the concourse level, each of the trash can bins having an upper end with a closed top, the upper end having timer openings adjacent to the closed top for receiving refuse therein when the trash can bins are in a vertical orientation perpendicular to the concourse floor surface, the upper side openings being on opposite sides of each trash can bin, and each trash can bin having a bottom end, the bottom end having front edge and side edges and rear edge that all sit directly on the concourse floor surface about each of the openings in the concourse floor surface, each trash can bin having closed side walls completely about each trash can bin, the closed sidewalls between the bottom end and the upper openings of each trash can bin, each trash can bin sitting directly over only the openings in the concourse floor surface so that only one trash can bin is connected to one chute;

a plurality of hinges attaching the bottom end of the trash can bins to the concourse floor surface of the concourse level, each of the hinges having an upper end attached directly to front edge on the bottom end of each trash can bin and each of the hinges having a lower end attached directly to the concourse floor surface, the hinges for allowing the trash can bins to pivot from a vertical upright position where the front edge and the side edges and the rear edge of each trash can bin sits directly on the concourse floor surface, and is tiltable to an inclined position where only the front edge of the bottom end of each trash can bin sits directly on the concourse floor surface and the side edges and the rear edge of each trash can bin is raised above the concourse floor surface, so that tilting the bins allows for the refuse to pass through the opening and directly into the chutes; and a plurality of locks for attaching the bottom end of the trash can bins to the concourse floor surface, each lock having an upper end attached the rear edge of each trash can bin, and each lock having a lower end attached directly to the concourse floor surface opposite to the hinge tier preventing each trash can bin from being able to pivot when the lock is in a closed position, each lock having an open position for allowing the trash can bin to move from the vertical upright position to the inclined position; wherein at least one chute is divided into two side by side chutes for separating refuse types between the side by side chute.

2. The system of claim 1, wherein the chutes are positioned at a vertical orientation.

3. The system of claim 1, wherein the chutes are positioned at an inclined orientation.

4. The system of claim 1, further comprising:

a dumpster positioned beneath the exit end of the chute(s).

5. The system of claim 1, further comprising:

a trash truck positioned beneath the exit end of the chute(s).

6. The system of claim 1, wherein at least one or the chutes is positioned adjacent to an entranceway to the concourse level.

7. The system of claim 1, further comprising:

a plurality of moveable grate covering the openings in the concourse floor surface located beneath the bins, the grate having openings sized large enough to allow loose trash to fall therebetween, and be adapted to support the weight of a human on the grate.

8. The system of claim 1, wherein the bins each includes:

a closed bottom; and a removable trash hag inside of the bin.

9. The system of claim 1, wherein the bins each includes:

an open bottom, wherein trash deposited into the bin directly passes into the chute underneath the bin.

10. A method of transporting refuse from different levels in a stadium to a collection location, comprising the steps of:

providing an upper seating level having a plurality of seats adapted for seating patrons in seated positions above an upper floor surface;

providing a lower seating level having a plurality of seats adapted for seating patrons in seated positions above a lower floor surface, the upper seating level being above the lower seating level;

providing a concourse level between the upper seating level and the lower seating level, the concourse level having a concourse floor surface, and having a plurality of entranceways for allowing patrons to enter and exit onto the upper and the lower seating levels;

providing a plurality of trash bin receptacles each with a closed top, and upper deposit openings adjacent to the closed top, the receptacles being located on the concourse floor surface of the concourse level;

providing a collection location for refuse at a different level beneath the concourse floor surface;

providing a plurality of chutes having only one single upper opening in the concourse floor surface beneath each of the receptacles and an exit located adjacent to the collection location where each single upper opening in the chutes is flush to the concourse floor surface and each single upper opening does not extend above the concourse floor surface, the upper deposit openings adjacent to the closed top on the trash bin receptacles being on opposite sides of each trash can bin and each trash bin receptacle having a bottom end, the bottom end having front edge and side edges and rear edge that all sit directly on the concourse floor surface about each of the openings in the concourse floor surface, each trash bin receptacle having closed sick walls completely about each trash can bin, the closed sidewalk between the bottom end and the upper openings of each trash bin receptacle, each trash bin receptacle sitting directly over only the openings in the concourse floor surface;

positioning each trash bin receptacle to sit only over the openings in the concourse floor surface so that only one trash can bin receptacle is used with one chute;

providing a plurality of hinges for attaching the bottom end of the trash bin receptacles to the concourse floor surface of the concourse level, each of the hinges having an upper end attached directly to front edge on the bottom end of each trash bin receptacle, and each of the hinges having a lower end attached directly to the concourse floor surface the hinges for allowing the trash bin receptacle to pivot relative to the concourse floor surface so that tilting the bins allows for the refuse to pass through the opening and directly into the chutes;

depositing refuse through only the deposit opening in the receptacle that passes through the chute to the collection station;

pivoting the trash bin receptacles from a vertical orientation to a tilt position to allow direct access to the opening to the chutes;

pushing additional refuse directly into the opening to the chute which passes to the collection station;

providing a plurality of locks for attaching the bottom end of each trash bin receptacle to the concourse floor surface, each lock having an upper end attached the rear edge of each trash bin receptacle, and each lock having a lower end attached directly to the concourse floor surface opposite to the hinge;

preventing each trash bin receptacle from being able to pivot when the lock is in a closed position; and unlocking each lock to an open position for allowing the trash bin receptacle to move from the vertical upright position to the inclined position; dividing at least one chute into two side by side chutes for separating refuse types between the side by side chutes.

11. The method of claim 10, further comprising the steps of:

filling up bags inside of the trash bin receptacles; and dropping the filled bags down the chutes after the trash bin receptacles are pivoted open.

12. The method of claim 11, further comprising the steps of:

sweeping loose trash by brooms into the chutes after the trash bin receptacles are pivoted open.

13. The method of claim 11, further comprising the steps of:

blowing loose trash by power blowers into the chutes after the trash bin receptacles are pivoted open.

14. The method of claim 11, further comprising the steps of:

pivotally attaching grates over the openings in the concourse floor level; and catching trash larger than spacings between the grates; and pivoting to open the grates to access the chutes.

* * * * *